United States Patent
Kasai

(10) Patent No.: US 7,231,133 B2
(45) Date of Patent: Jun. 12, 2007

(54) IMAGE PROCESSING SYSTEM AND METHOD, MEMORY CARD, AND STORAGE MEDIUM

(75) Inventor: Kazuhiro Kasai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1036 days.

(21) Appl. No.: 09/746,615

(22) Filed: Dec. 21, 2000

(65) Prior Publication Data

US 2001/0021251 A1  Sep. 13, 2001

(30) Foreign Application Priority Data

Dec. 27, 1999  (JP) .................................. 11-371780

(51) Int. Cl.
*H04N 5/91* (2006.01)
(52) U.S. Cl. ........................................ 386/94; 380/282
(58) Field of Classification Search .................. 386/46, 386/94, 95, 52; 713/176; 711/164, 156; 380/282
See application file for complete search history.

(56) References Cited

U.S. PATENT DOCUMENTS

| | | | |
|---|---|---|---|
| 5,608,536 A | | 3/1997 | Takahashi et al. |
| 5,623,637 A | * | 4/1997 | Jones et al. .................. 711/164 |
| 5,829,044 A | * | 10/1998 | Sono .......................... 711/156 |
| 5,898,779 A | * | 4/1999 | Squilla et al. ............... 713/176 |
| 6,131,162 A | * | 10/2000 | Yoshiura et al. ............ 713/176 |
| 6,625,334 B1 | * | 9/2003 | Shiota et al. ............... 382/305 |

* cited by examiner

*Primary Examiner*—Huy Nguyen
(74) *Attorney, Agent, or Firm*—Morgan & Finnegan LLP

(57) ABSTRACT

A transfer unit and an image output control unit are provided in order to check and prevent any alteration or forgery of image file data in a memory card. The transfer unit transfers a digital signature of the image file data stored in the memory card, a secret key used for the digital signature or a public key paired to the secret key, together with the image file data and a property file, to an image control apparatus. The image output control unit controls an image output in accordance with the information transferred by the transfer unit.

29 Claims, 11 Drawing Sheets

FIG. 6
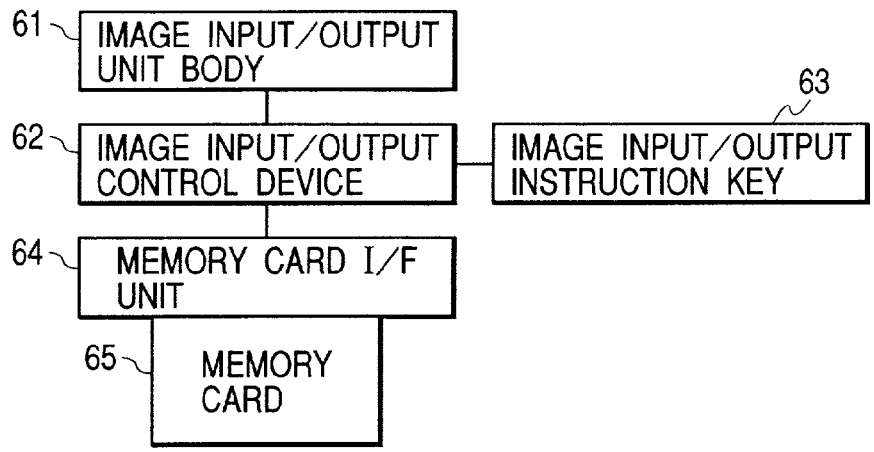
FIG. 7
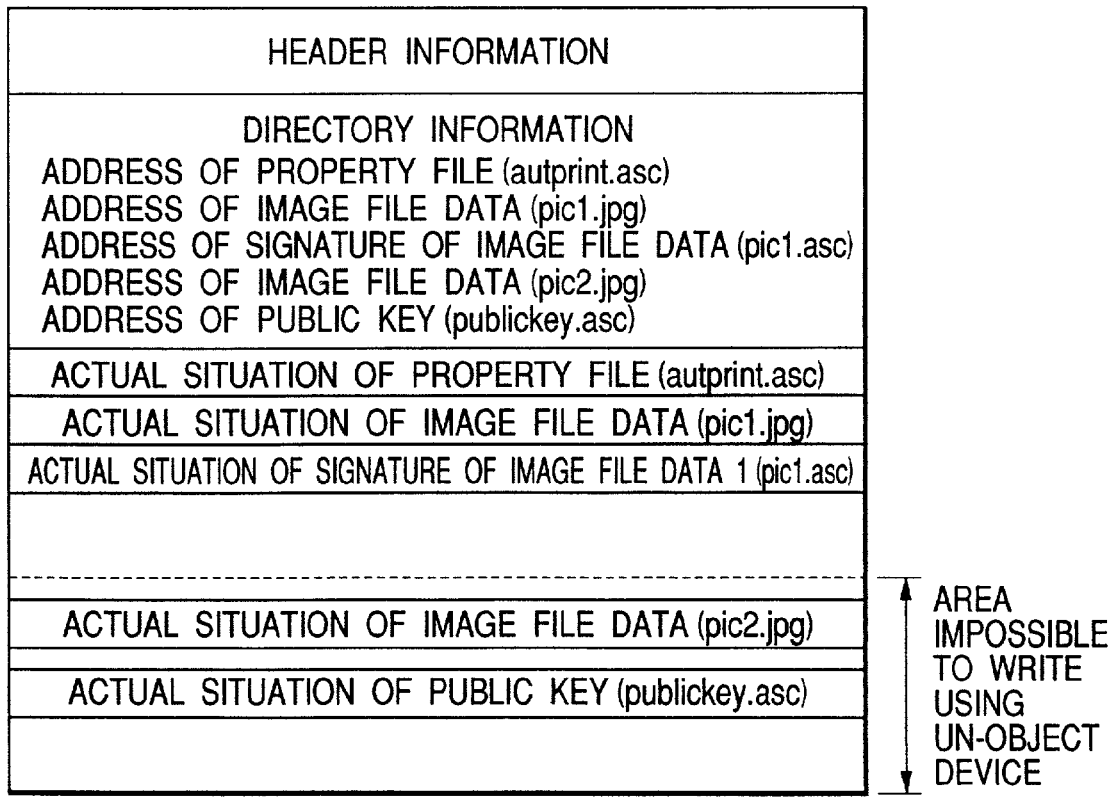
FIG. 8
pic1.jpg, A4, SS, 1P
FIG. 9
pic1.jpg, A4, SS, 1P, NK1, UMO

IMAGE PROCESSING SYSTEM AND METHOD, MEMORY CARD, AND STORAGE MEDIUM

BACKGROUND OF THE INVENTION

1. Field of the Invention

The present invention relates to an image processing system, an image processing method, a memory card and a storage medium, and more particularly to an image processing system and method capable of improving the reliability of image file data by using a digital signature.

2. Related Background Art

In image processing systems and methods practically used nowadays, data generated by a personal computer (hereinafter, abbreviated as PC), an electronic pocketbook, a digital camera or the like is once transferred to and stored in a storage medium and thereafter, the storage medium is connected to an image control device to facilitate printing.

Such data includes output image file data as well as a property file describing which image is output in accordance with what output specifications.

FIG. 6 is a block diagram of an image processing system disclosed in Japanese Patent Application Laid-open No. 10-226117.

This image processing system has an image input/output unit (main) body 61, an image input/output control device 62, an image input/output instruction key 63, a memory card I/F unit 64 and a memory card 65.

The image input/output control device 62 reads image file data and a property file from the memory card 65 in order to execute an image output process. The property file is included in the image file data and describes what data is to be transferred to the image input/output unit body 61 in accordance with what output specifications to form an image.

Such a conventional image output method is, however, associated with a problem that even if image file data stored in a memory card is altered or forged, it is not possible to discriminate between original data and altered or forged data and to verify the image file data.

Another problem is that if a third party has the memory card, data in this card may be used illegally. Namely, the problem is a lack of security of data in the memory card and inability to guarantee data reliability.

By storing property information designating an image output format in a memory card, an image in a format intended by a distributor (writer) can be supplied. Such format includes, for example, to record which image or images are recorded on a single sheet, to output an image at each designated resolution, to combine an additional image representative of an image proprietor, and the like. However, in this case, if data is altered, the format intended by the distributor cannot be supplied.

This may pose another problem if a copyrighted image is to be distributed.

On the image reception side, an image not guaranteed as genuine may be output.

SUMMARY OF THE INVENTION

It is an object of the invention to solve all the above-described problems or at least one of the problems.

It is another object of the present invention to examine alteration and forgery of image file data in a storage medium and to improve the reliability of image output from a storage medium.

It is another object of the invention to prevent printing of an illegally altered image during image processing in accordance with property information defining an image data processing method such as a print method.

In order to achieve the above objects, the invention discloses an image processing apparatus for processing an image in accordance with property information for defining an image processing method for processing image data of the image, comprising:

an inputting unit for inputting the image data, key information used for recognizing alteration of the image data, and the property information;

a judging unit for judging from the image data and the key information input by the inputting unit whether the image data was altered; and a controlling unit for controlling an execution of the image processing method in accordance with a judgement by the judging unit and the property information.

It is another object of the invention to output a designated image in a designated format by storing image data and property information defining an image processing method for processing the image data in a storage medium such as a memory card.

It is another object of the invention to prevent an image output in a format different from the designated format.

It is another object of the invention to guarantee an image processing method intended by a distributor (such as an output format).

In order to achieve the above objects, the invention discloses an image processing system with an interface capable of accessing a memory medium, comprising:

an information reading unit for reading a digital signature of image file data stored in the memory medium, a secret key used for the digital signature, or a public key paired to the secret key, together with the image file data and property information for defining an image processing method for processing image data; and an image output controlling unit for outputting an image in accordance with information read by the information reading means.

The invention further discloses an image processing system with an interface capable of accessing a memory medium, comprising:

a memory medium detecting unit for detecting a connection of the memory medium to the interface;

an information reading unit, responsive to a detection of the connection of the memory medium by the memory medium detecting unit, for reading a digital signature of image file data stored in the memory medium, a secret key used for the digital signature, or a public key paired to the secret key, together with the image file data and property information for defining an image processing method for processing image data; and an image output controlling unit for outputting an image in accordance with information read by the information reading unit.

The invention further discloses an image processing system with an interface capable of accessing a memory medium, comprising:

an image file data generating unit for generating image file data to be stored in the memory medium;

an image file data storing unit for storing the image file data generated by the image file data generating unit in the memory medium;

a calculating unit for calculating an image file specific value obtained from the image file data by using a one-way function; and a digital signature generating unit for dycrypting the value calculated by the calculating unit by using a secret key stored in the memory medium.

The invention further discloses a memory card storing:
image data file;
digital signature information of the image data file;
secret key information used for the digital signature;
public key information paired to the secret key; and
property information defining an image processing method for processing image data.

Other objects and features of the present invention will become apparent from the following detailed description of embodiments when read in conjunction with the accompanying drawings.

BRIEF DESCRIPTION OF THE DRAWINGS

FIG. 6 is a block diagram showing an example of an image processing system connected to a memory card.

FIG. 7 is a diagram showing an example of a memory map of a memory card used by the first embodiment and second and third embodiments of the invention.

FIG. 8 is a diagram showing an example of the contents of a property file script of the first embodiment.

FIG. 9 is a diagram showing an example of the contents of a property file script of the second embodiment.

DETAILED DESCRIPTION OF THE PREFERRED EMBODIMENTS

Embodiments of an image processing system, an image processing method, a memory card, and a storage medium according to the invention will be described with reference to the accompanying drawings.

First Embodiment

Figure 1:
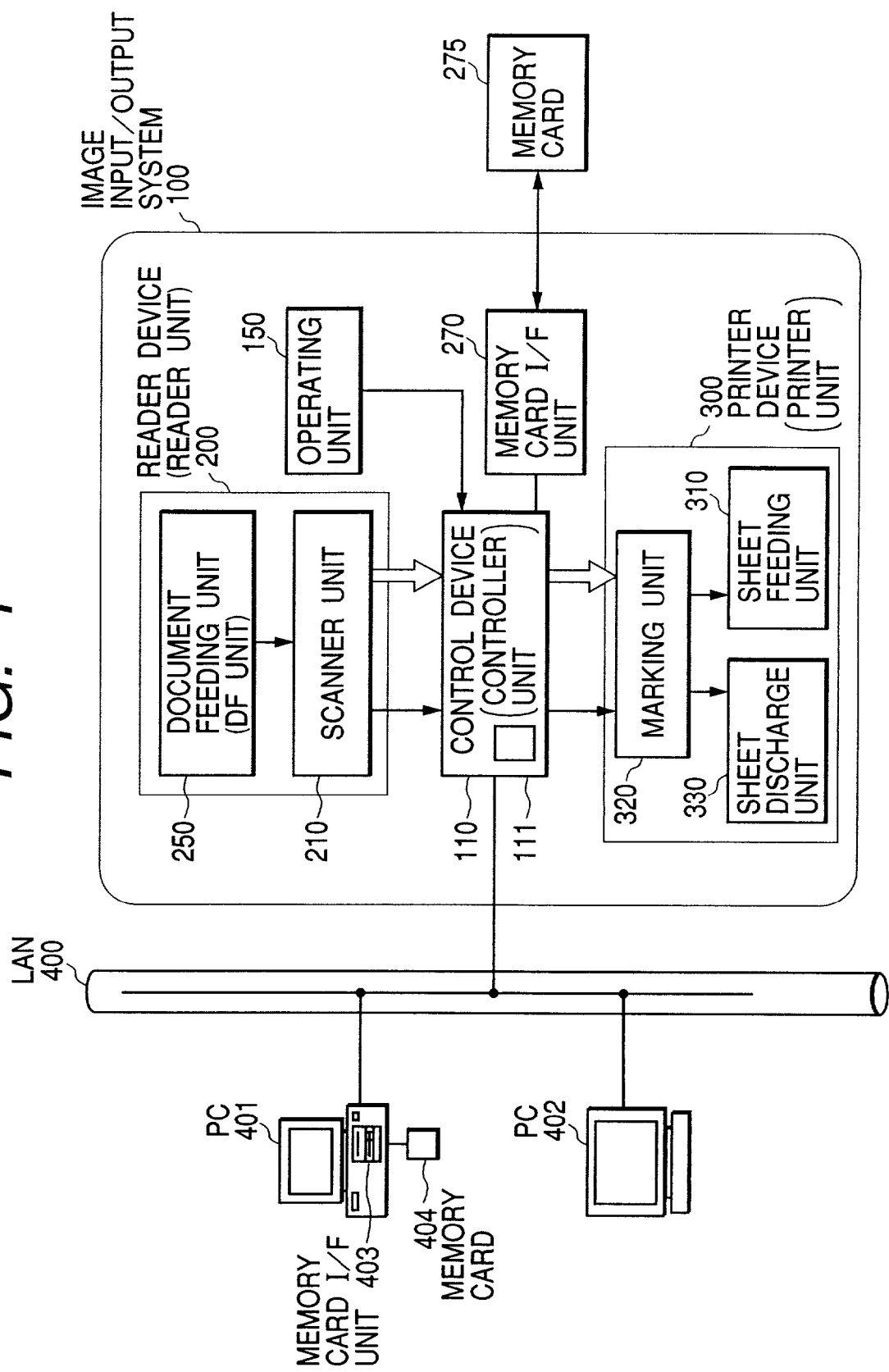
FIG. 1 is a block diagram briefly showing the structure of an image processing system according to a first embodiment of the invention.

FIG. 1 is a block diagram showing the overall structure of an image processing system according to the first embodiment of the invention.

As shown in FIG. 1, the image processing system has a reader unit (image input device) 200 and a printer unit (image output device) 300.

The reader unit (image input device) 200 optically reads a document image and converts it into image data. The reader unit 200 has a scanner unit 210 having a function of reading a document and a document feeding unit 250 having a function of feeding a document sheet.

The printer unit (image output device) 300 transports a recording sheet, prints image data on the recording sheet as a visual image, and discharges the recording sheet. The printer unit 300 has a sheet feeding unit 310 having a plurality type of recording sheet cassettes, a marking unit 320 having a function of transferring image data to a recording sheet and fixing it, and a sheet discharge unit 330 having a function of sorting printed recording sheets, stapling them and discharging them out of the system.

The image processing system 100 of this embodiment also has a memory card interface (I/F) unit 270 and a control device 110. The memory card interface (I/F) unit 270 reads data stored in a memory card 275 and writes data stored in a storage unit 111 of the control device 110 into the memory card 275.

The control device 110 is electrically connected to the reader unit 200, printer unit 300 and memory card I/F unit 270, and via a network 400 to host computers 401 and 402.

The control system 110 is made of a computer system including a CPU, a ROM, a RAM and the like. In this embodiment, programs of this computer system constitute an information reading unit, an image output controlling unit, a digital signature decrypting unit, a message digest value calculating unit, a digital signature decrypting unit, a comparing unit, an image file data verifying (examining) unit, a memory medium detecting unit, an image file data generating unit, an image file data storing unit, a digital signature generating unit, a digital signature storing unit, a first storing unit, a second storing unit, a secret key generating unit, and the like.

The control unit 110 constituting the above-described units controls the reader unit 200 to read image data of a document, and controls the printer unit 300 to provide a copy function of outputting the image data to a recording sheet.

The control device 110 also provides a scanner function of converting image data read from the reader unit 200 or memory card I/F unit 270 into code data and transmitting it to the host computer via the network 400 and a printer function of converting code data received from the host computer via the network 400 into image data and outputting it to the printer unit 300.

An operating unit 150 is connected to the control unit 110, made of a liquid crystal touch panel, and provides a user I/F for operating upon the image processing system.

Figure 2:
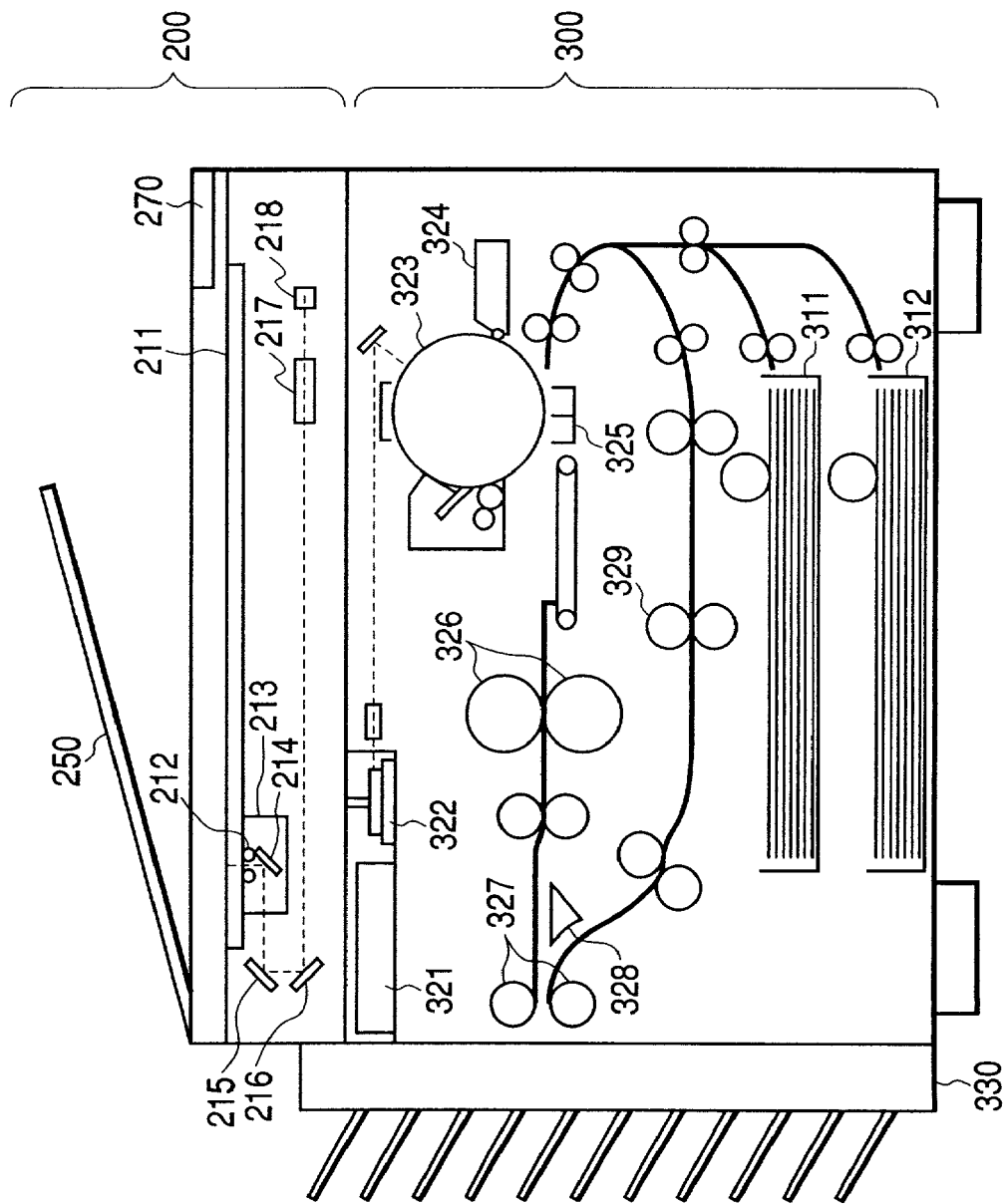
FIG. 2 is a schematic cross sectional view showing the structure of an image output device of the invention.

FIG. 2 is a schematic cross sectional view briefly showing the structure of the reader unit 200 and printer unit 300. The document feeding unit 250 of the reader unit 200 feeds one document after another starting from the top of documents to a platen glass 211, and discharges the document on the platen glass 211 after the document read operation is completed.

When a document is fed to the platen glass 211, the control device 110 turns on a lamp 212, and starts moving an optical unit 213 to expose and scan the document. Reflected light from the document is guided to a CCD image sensor (hereinafter simply described as CCD) 218 via mirrors 214, 215, and 216 and a lens 217.

The scanned document image is read with CCD 218. Image data output from CCD 218 is subjected to predetermined processes and transferred to the control device 110.

A laser driver 321 of the printer unit 300 drives a laser radiation unit 322 to radiate a laser beam corresponding to image data output from the control device 110.

This laser beam is applied to a photosensitive drum 323 to form thereon a latent image corresponding to the laser beam. The latent image of the photosensitive drum 323 is coated with developing agent by a developer 324.

At a timing synchronizing with a laser beam radiation start time, a recording sheet is fed from one of cassettes 311 and 312 to a transfer unit 325 whereat the developing agent attached to the photosensitive drum 323 is transferred to the recording sheet.

The recording sheet attached with the developing agent is transported to a fixing unit whereat the developing agent is fixed to the recording sheet by heat and pressure of the fixing unit 326.

The recording sheet passed the fixing unit 326 is then discharged by discharge rollers 327. A sheet discharge unit 330 sorts discharged recording sheets, bundles them, staples the sorted recording sheets.

If a both-side print mode is set, after a recording sheet is transported to the position before the discharge rollers 327, the rotation direction of the discharge rollers 327 is reversed to guide the recording sheet to a sheet re-feed transport path 329 by using a flapper 328. The recording sheet guided to the sheet re-feed transport path 329 is fed to the transfer unit 325 at the above-described timing.

In the image processing system of this embodiment constructed as above, a digital signature is given to image file data in the memory card to improve the reliability of the image file data in the memory card.

As current digital signature techniques, a so-called asymmetric public key method such as an RSA (Rivest, Shamir, Adelman) method is known. The asymmetric public key method uses a pair of key information pieces, "public key" and "secret key".

Figure 3:
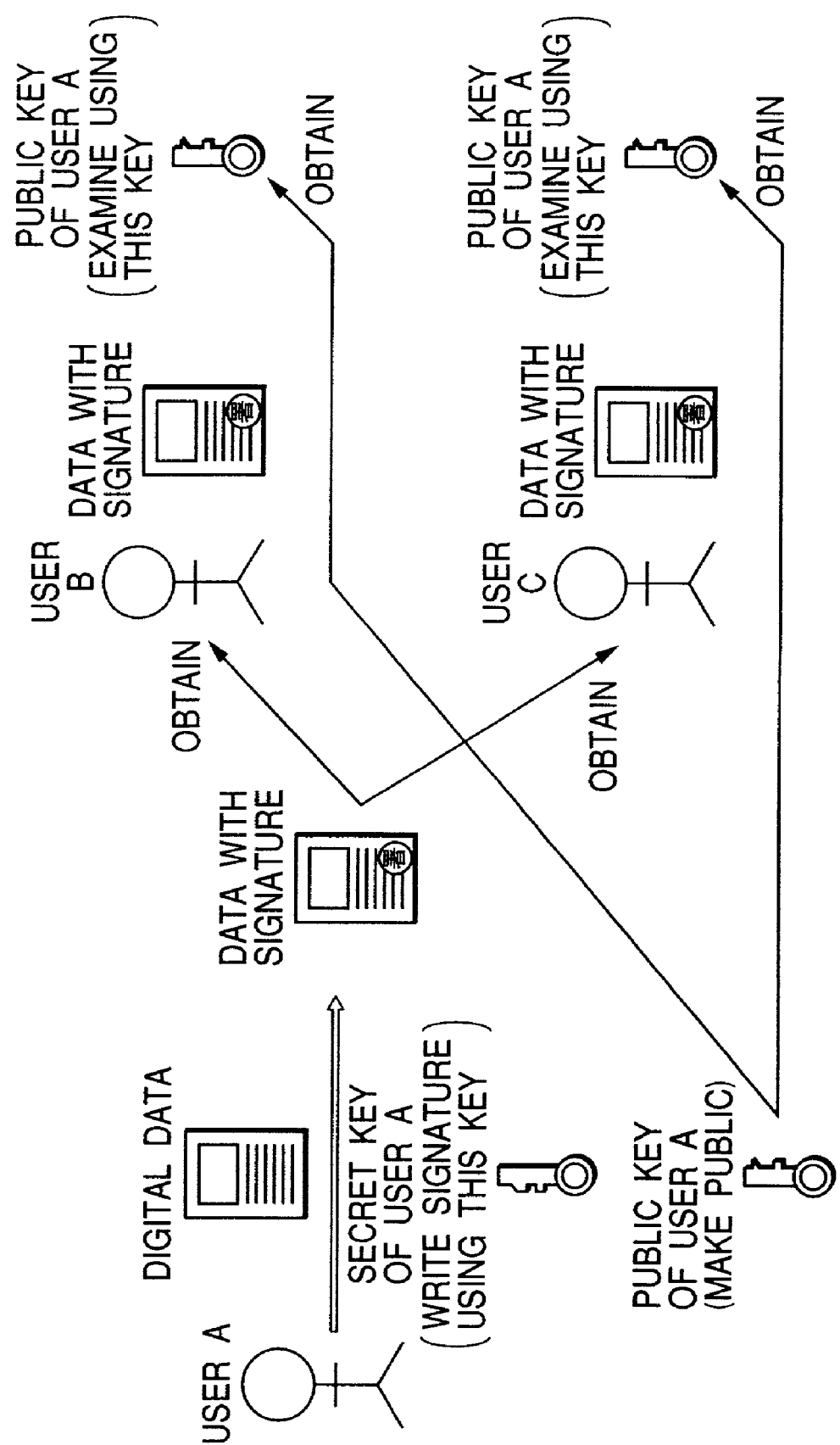
FIG. 3 is a diagram illustrating a digital signature.
Figure 4:
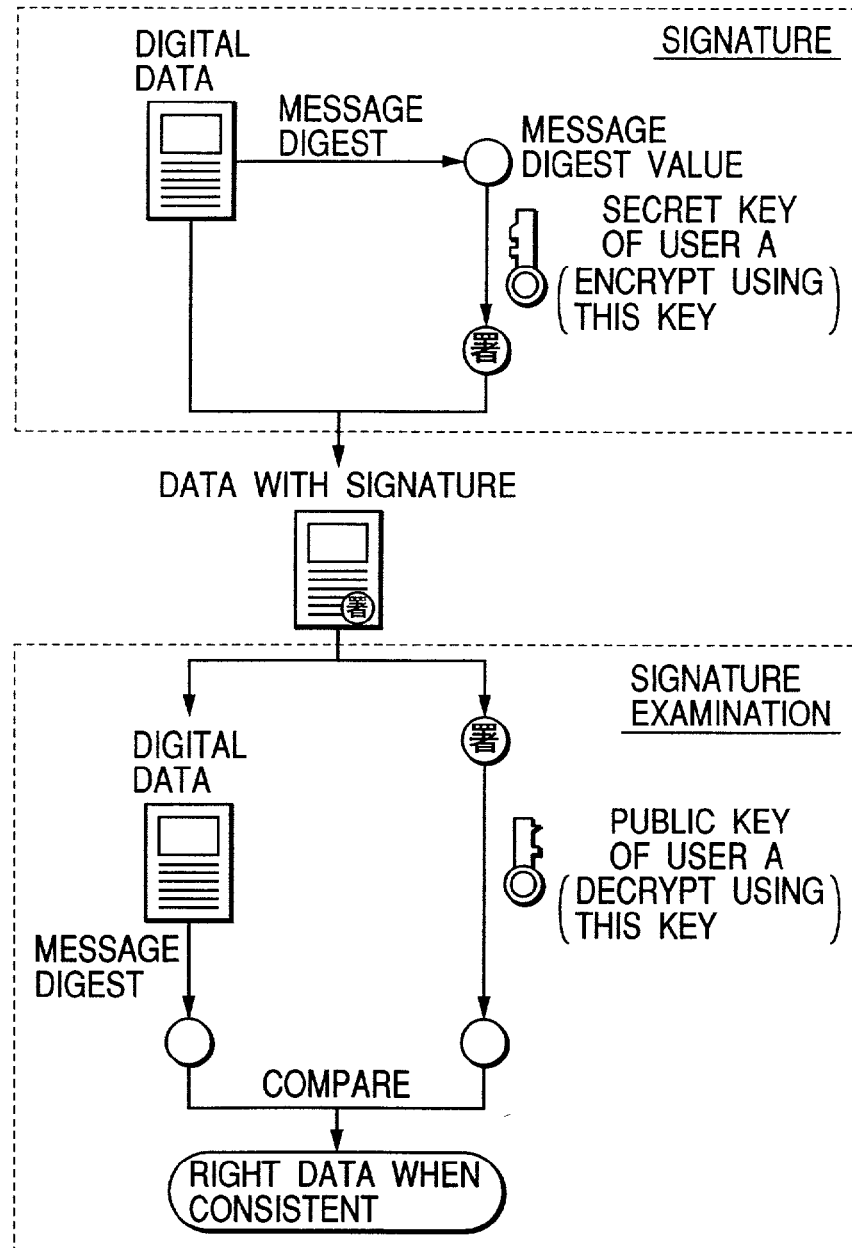
FIG. 4 is a diagram illustrating a digital signature.

FIGS. 3 and 4 conceptually illustrate digital signatures. The features of this technique reside in "a message digest value" and a "public key" shown in FIG. 4.

The message digest value is specific to each message. First, a message digest value for data (text or binary) to be signed is calculated. This message digest value is calculated from data to be signed, by using a one-way function (hash function), and has a value specific to the data. The calculated message digest value is encrypted by using a secret key.

In transmitting/receiving digital data, the transmission side transmits the digital data and, as its signature the message digest value encrypted by the secret key, to the reception side. The reception side decrypts the received signature data by using the public key of the signature side to obtain the message digest value.

The message digest value calculated from the received digital data is compared with the decrypted message digest value. The digital signature is realized by performing the signature examination in the above-described manner.

FIG. 7 shows an example of a memory map of the memory card 275 which stores image file data and a property file.

The property file is basically written in the text format using only ASCII codes, and the designation information of the property file is completed for each print job. Only one property file exists in the memory card, whereas image file data is stored at any location of the memory card. The property file has a data storage area in which an apparatus different from a subject apparatus cannot write data.

Figure 10:
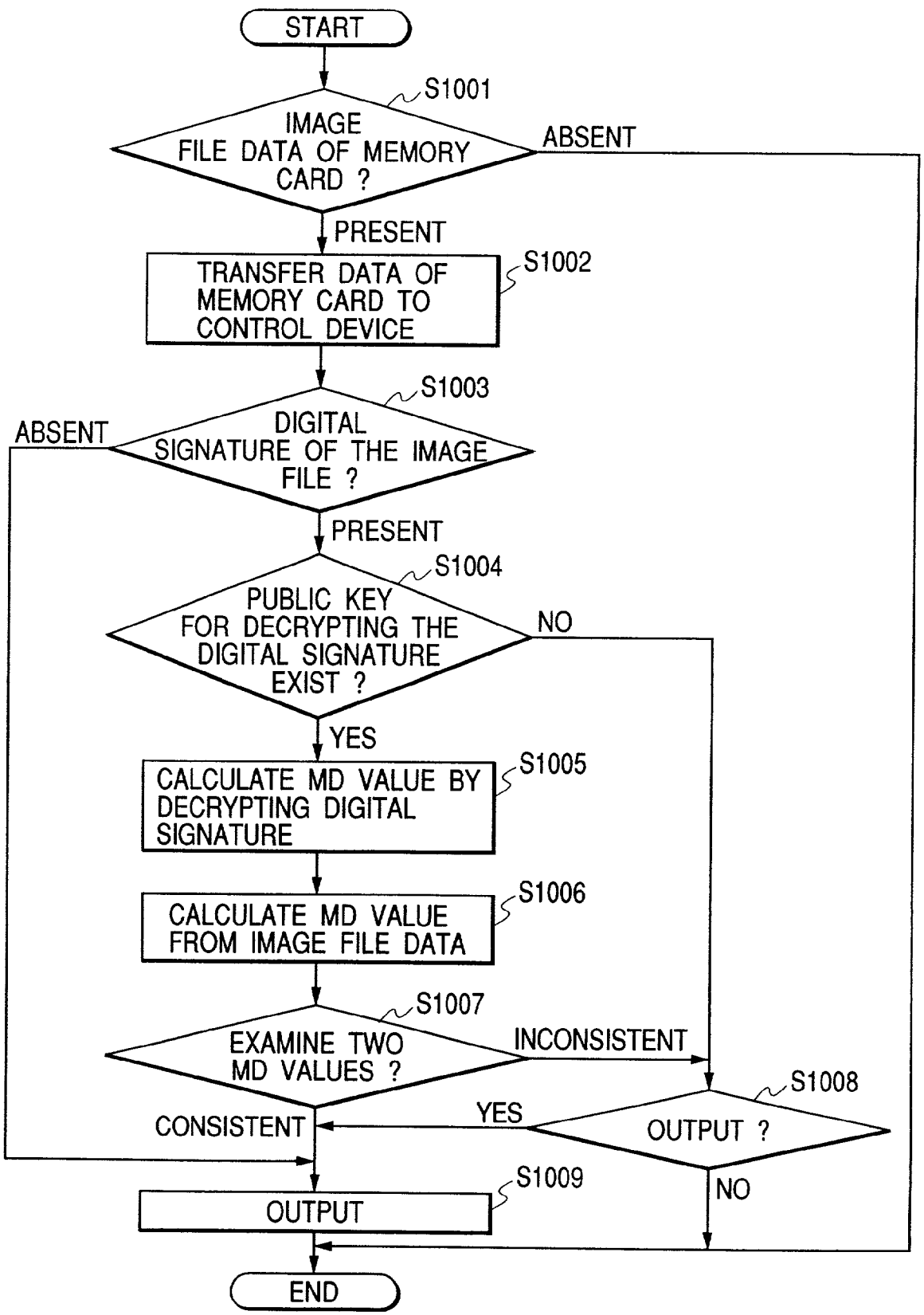
FIG. 10 is a flow chart illustrating a procedure of the first embodiment.

With reference to FIGS. 1 and 2 showing the structure of the system and the flow chart of FIG. 10, an example of the control procedure by the image processing system according to the first embodiment will be described, the image processing system having an image file data alteration preventing method using a memory card.

Figure 5:
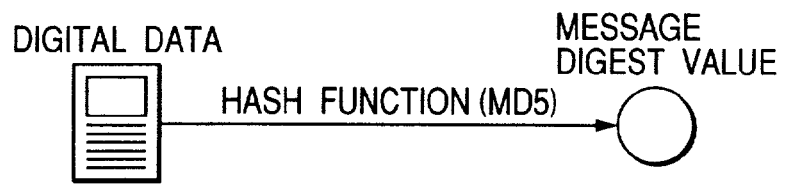
FIG. 5 is a diagram illustrating a relation between digital data and a message digest value.

In this embodiment, as shown in FIG. 5, the message digest value of data to be signed is calculated by a hash function called MD 5. MD 5 is a message digest function currently used by PGP (Pretty Good Privacy) which is one of encryption programs.

In the image processing system of this embodiment, the control is performed under the condition that the memory card 275 having the memory map shown in FIG. 7 is connected to the memory card I/F unit 270. In this example, as shown in FIG. 8, the print job description of the property file is "pic1.jpg, A4, SS, 1P" which means that an output file name is "pic1.jpg", an output sheet size is "A4", a single-side print is "SS", and a number of output sheets is "1P". In order to output image file data in the memory card 275, a user depresses a memory card image data output key of the operating unit 150 to start an examination/output control of the image data file.

The control device 110 confirms via the memory card I/F unit 270 whether the memory card 275 stores data to be output to the image processing system (Step S1001).

For example, as shown in the memory map shown in FIG. 7, the memory card 275 stores two sets of image file data (pic1.jpg and pic2.jpg), a signature (pic1.asc) of the image file data (ipc1), a public key (publickey.asc), and a property file (autprint.mrk). This data set is transferred via the memory card I/F unit 270 to the control unit 110 (Step S1002).

If the data is not stored, the control is terminated.

Next, the control device 110 confirms whether the digital signature for each transferred image file data set exists or not (Step S1003). In this example, pic1.asc is the digital signature of pic1.jpg. If the digital signature does not exist, it is judged that the image file data is not given a digital signature, and an image is output in accordance with the print job information written in the property file, without performing a cipher verification process.

If the digital signature exists, it is confirmed whether the public key for decrypting the digital signature is transferred to the image processing system (Step S1004). If the public key does not exist, a message "No public key" is displayed on the operating unit. In this case, the user selects and designates via the operating unit 150 either outputting an image in accordance with the print information written in the property file without performing the cipher verification, or terminating the control.

If the public key (in this case, publickey.asc) exists, the message digest value is calculated from the digital signature by using the public key (Step S1005). Another message digest key is calculated from the image file data (Step S1006). These two MD values are compared with each other for examination (Step S1007).

If this examination results are consistent or coincident, it can be judged that the image file data was not altered so that an image output process is executed in accordance with the print jot information written in the property file (Step S1009).

If the examination results are inconsistent, it can be judged that the image file data was altered and an error message "Signature inconsistent" is displayed on the operating unit. The user selects and designates via the operating unit 150 either outputting the altered image in accordance with the print information written in the property file, or terminating the control (Step S1008).

Second Embodiment

Figure 11:
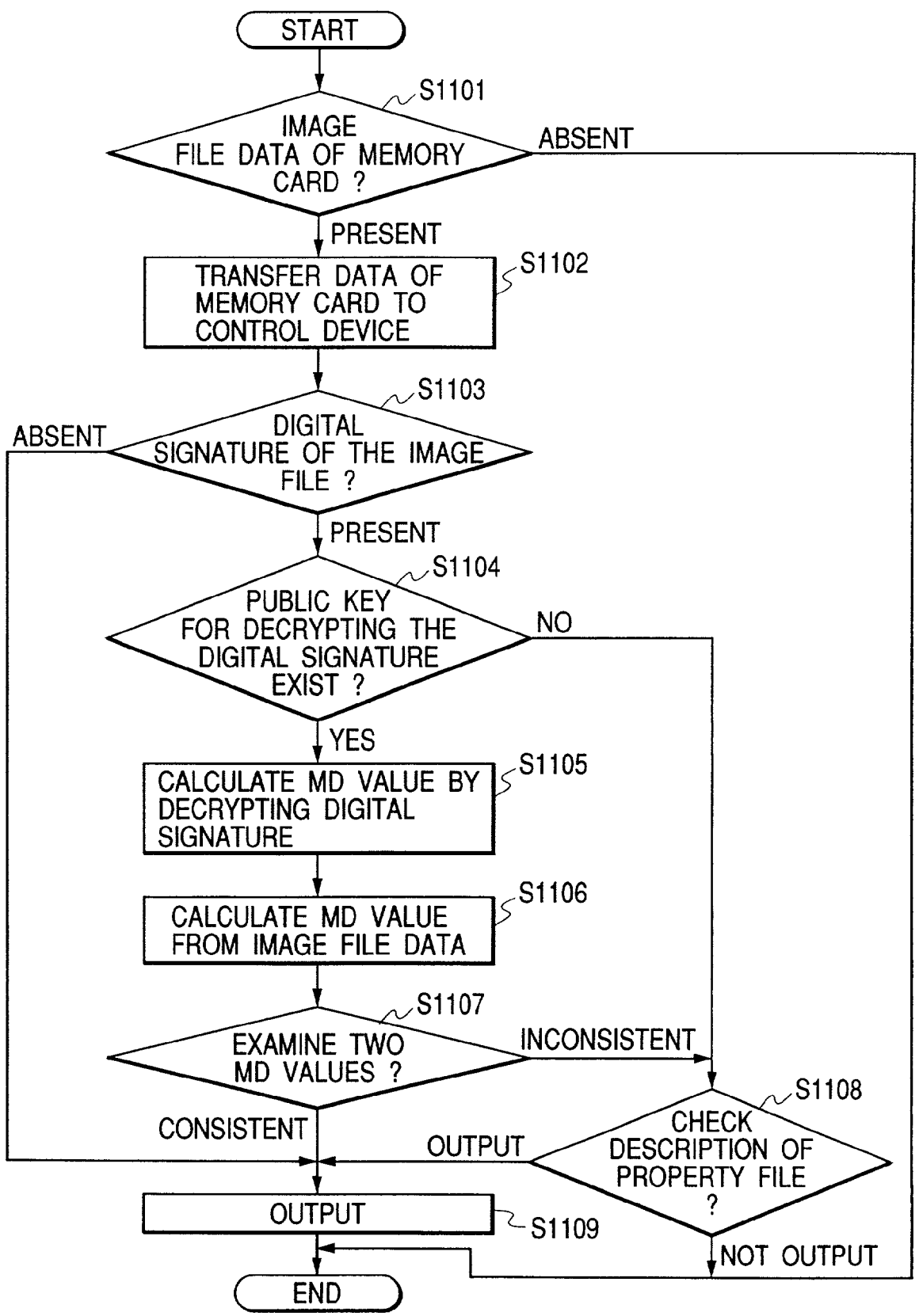
FIG. 11 is a flow chart illustrating a procedure of the second embodiment.

In the first embodiment described above, a method of outputting image file data in the memory card in accordance with a user instruction has been described. In the second embodiment, the selections made by a user in the first embodiment are written in the property file of the memory card, and the control is executed in accordance with the selections written in the property file when the user depresses the memory card image data output key of the operating unit 150 or when the control device 110 detects an insertion of the memory card 275 into the memory card I/F unit 270. This embodiment will be described with reference to FIGS. 1 and 2 showing the structure of the system and the flow chart of FIG. 11.

Similar to the first embodiment, in the image processing system of this embodiment, the control is performed under the condition that the memory card 275 having the memory map shown in FIG. 7 is connected to the memory card I/F unit 270. In this example, as shown in FIG. 9, the print job description of the property file is "pic1.jpg, A4, SS, 1P, NK1, UM0" which means that an output file name is "pic1.jpg", an output sheet size is "A4", a single-side print is "SS", a number of output sheets is "1p", an output without public key is "NK1, and no output with inconsistent signature examination is UM0.

In order to output image file data in the memory card 275, a user depresses a memory card image data output key of the operating unit 150 or the control device 110 detects an insertion of the memory card 275 into the memory card I/F unit 270, to start an examination/output control of the image data file.

The control device 110 confirms via the memory card I/F unit 270 whether the memory card 250 stores data to be output to the image processing system (Step S1101). If the data is stored, this data is transferred to the control device 110 via the memory card I/F unit 270 (Step 1102). If the data is not stored, the control is terminated.

Next, the control device 110 confirms whether the digital signature for each transferred image file data set exists or not (Step S1103). In this example, pic1.asc is the digital signature of pic1.jpg. If the digital signature does not exist, it is judged that the image file data is not given a digital signature, and an image is output in accordance with the print job information written in the property file, without performing a cipher verification process (Step S1109).

If the digital signature exists, it is confirmed whether the public key for decrypting the digital signature is transferred to the image processing system (Step S1104). If the public key does not exist, a message "No public key" is displayed on the operating unit. In this case, in accordance with the control method (in the example shown in FIG. 9, output) written in the property file, either an image is output in accordance with the print information written in the property file without performing the cipher verification, or the control is terminated.

If the public key exists, the message digest value is calculated from the digital signature by using the public key (Step S1105). Another message digest key is calculated from the image file data (Step S1106). These two MD values are compared with each other for examination (Step S1107).

If this examination results are consistent, it can be judged that the image file data was not altered so that an image output process is executed in accordance with the print jot information written in the property file. If the examination results are inconsistent, it can be judged that the image file data was altered and an error message "Signature inconsistent" is displayed on the operating unit.

In accordance with the control method (in the example shown in FIG. 9, no output) written in the property file, either the altered image is output in accordance with the print information written in the property file, or the control is terminated (Step S1108). Thereafter, the control is terminated.

Third Embodiment

In the first and second embodiments, the image file data examination/output method has been described in which the image file data is stored in the memory card and read via the memory card I/F unit of the image processing system.

Figure 12:
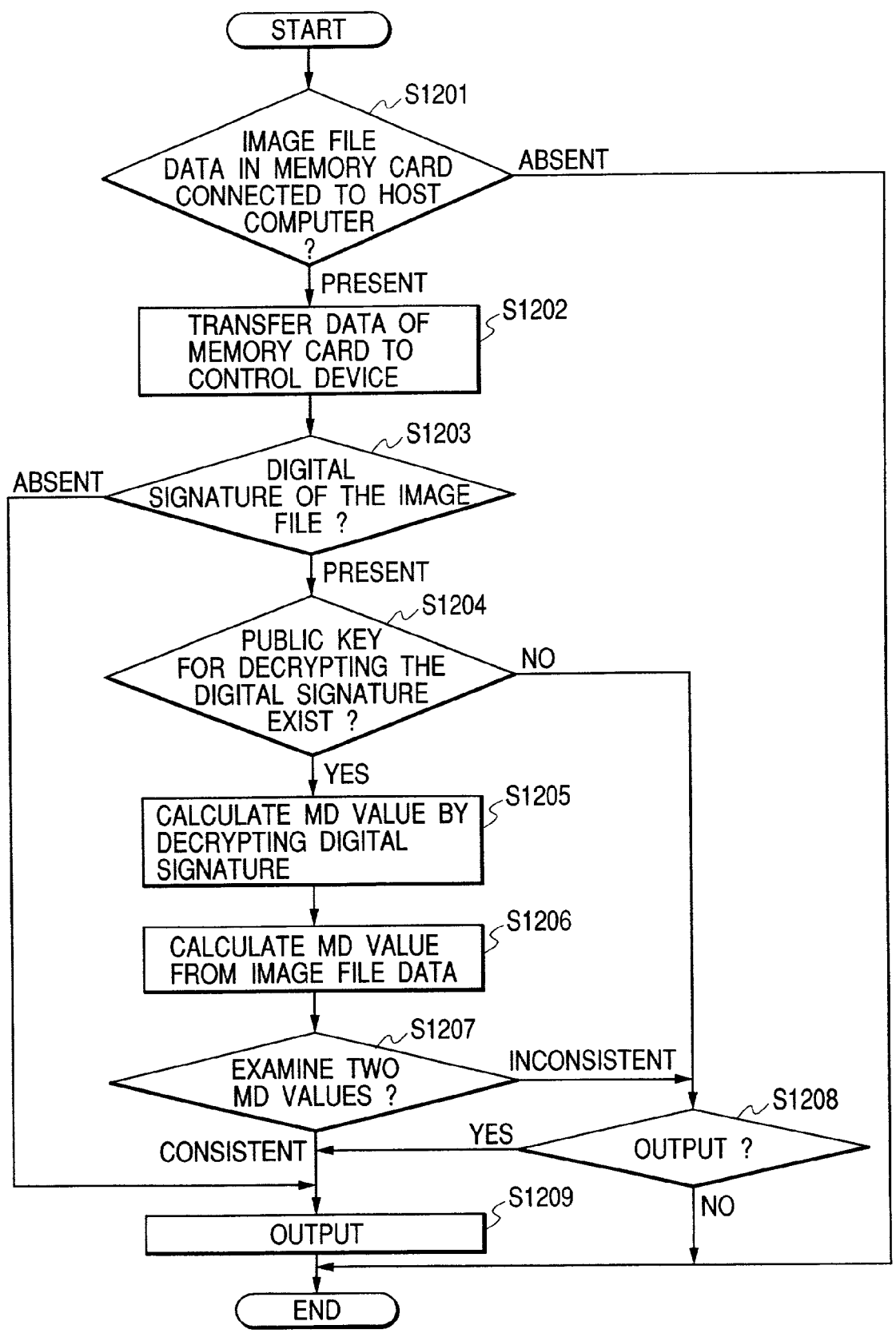
FIG. 12 is a flow chart illustrating a procedure of the third embodiment.

In the third embodiment, the image file data examination/output method will be described in which the image file data is stored in a memory card and read via a memory card I/F unit of a host computer connected to the image processing system via a network. This embodiment will be described with reference to FIGS. 1 and 2 showing the structure of the system and the flow chart of FIG. 12.

Similar to the first and second embodiments, in the image processing system of the third embodiment, the control is performed under the condition that a memory card 404 is connected to a memory card I/F unit 403.

In order for the host computer 401 to acquire image file data in the memory card 404 and transferring it to the control device 110 of the image processing system 100 via the network to print it out, an acquisition/examination/output control for image file data starts when a user instructs the host computer to start the control or when a user depresses an acquisition/output key of the operating unit 150 of the image processing system 100. In this manner, the image data in the memory card 404 is acquired and output via the host computer 401 connected to the network 400.

The control device 110 confirms, via the memory card I/F unit 403 of the host computer 401 connected to the network 4, whether or not the memory card 404 stores output data (Step S1201). If stored, the data is transferred to the control device 110 via the memory card I/F unit 403 and network 400 (Step S1202), whereas if not stored, the control is terminated.

If a necessary program is not stored in the control device 110, this program is transferred from the host computer 401 to the control device 110 via the network 400.

Next, the control device 110 confirms whether a digital signature of an image corresponding to the transferred image file data exists (Step S1203). If it is confirmed that the digital signature does not exist, it is judged that the image file data is not given a digital signature and the image is output in accordance with the print job information written in the property file without executing a cipher examination process (Step S1209).

If it is confirmed that the digital signature exists, it is confirmed whether the public key for decrypting the digital signature exists (Step S1204). If the public key does not exist, a message "No public" is displayed on the operating unit 150 or on the host computer 401. In this case, whether the image is output in accordance with the print job information written in the property file, without executing a cipher examination process, or the control is terminated, is selected and designated by the operating unit 150 or host computer 401. Alternatively, the control is executed by the control method described in the property file (in the example shown in FIG. 9, output).

If the public key exists, the message digest value is calculated from the digital signature by using the public key (Step S1205), and another message digest value is calculated from the image file data (Step S1206). These two MD values are compared with each other for examination (Step S1207).

If this examination results are consistent, it can be judged that the image file data was not altered so that an image output process is executed in accordance with the print job information written in the property file (Step S1209). If the examination results are inconsistent, it can be judged that the image file data was altered and an error message "Signature inconsistent" is displayed on the operating unit 150 or on the host computer 401.

Whether the altered image is output in accordance with the print job information written in the property file, or the control is terminated, is selected and designated by the operating unit 150 or host computer 401. Alternatively, the control is executed by the control method described in the property file (in the example shown in FIG. 9, no output) (Step S1208). Thereafter, the control is terminated.

Fourth Embodiment

In this fourth embodiment, a method of signing an image by using a secret key in the control device and storing the image file data, digital signature and property file in a memory card will be described, the image being acquired either from the reader unit of the image processing system or from the host computer connected via the network.

When a control execution button or the like of the operating unit 150 of the image processing system is depressed, a control operation starts to acquire a document at the reader unit 200 and store image data of the document.

First, a control procedure of reading a document will be described with reference to the cross sectional view of FIG. 2. As a document is transported to the platen glass 211, the lamp 212 is turned on. A motion of the optical unit 213 starts to expose and scan the document. Light reflected from the original is guided to the CCD image sensor (hereinafter simply called CCD) 218 via the mirrors 214, 215 and 216 and lens 217.

The image of the document scanned in this manner is read with CCD 218. Image data output from CCD 218 is subjected to predetermined processes and transferred to the control device 110.

Alternatively, when a control execution button of the host computer 401, 402 or operating unit 150 is depressed, a control operation starts to transfer image file data in the host computer 401, 402 to the control device 110 via the network 400 and store it in the memory card 275. The image file data is therefore transferred via the network 400 to the control device 110 of the image processing system.

Figure 13:
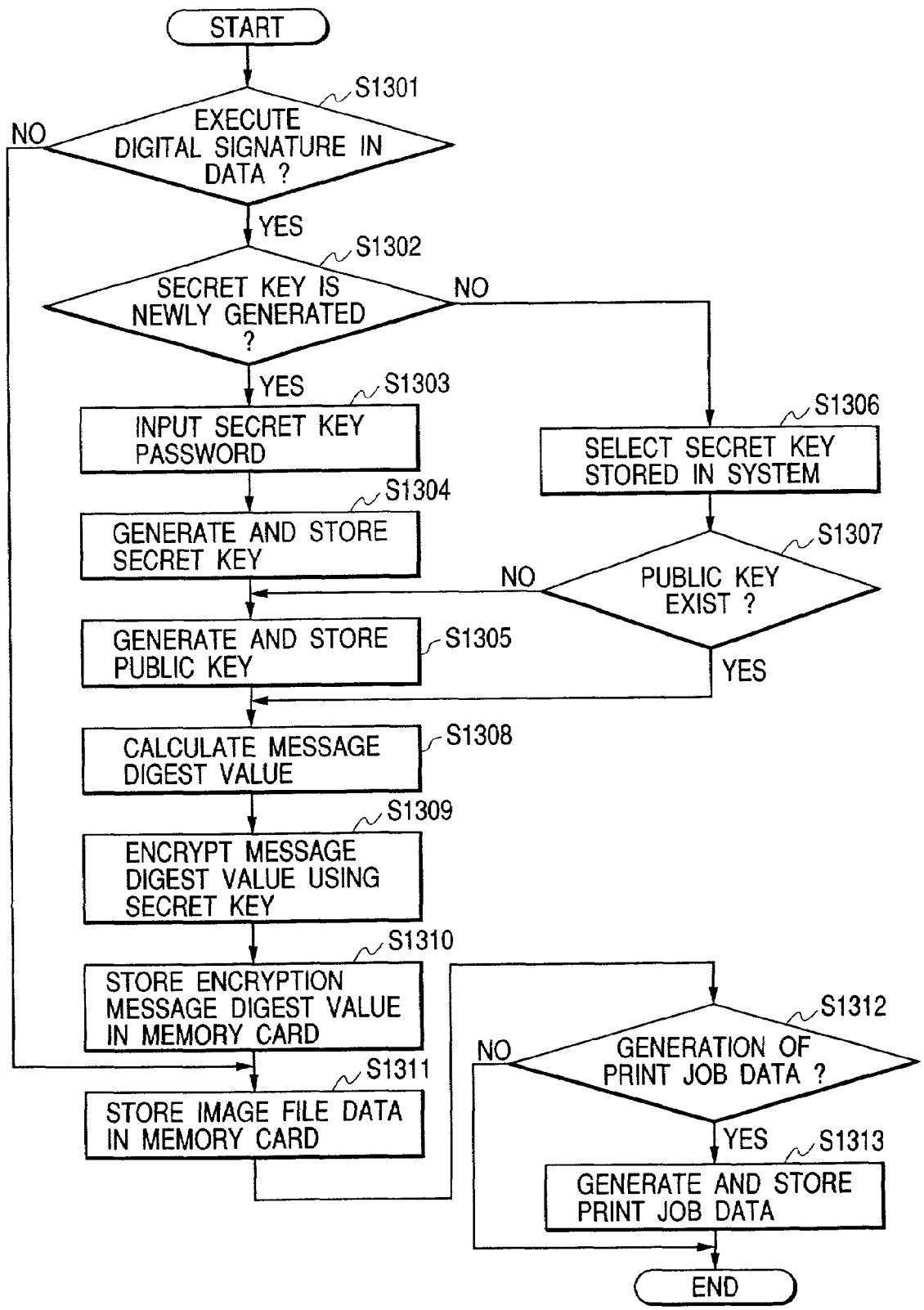
FIG. 13 is a flow chart illustrating a procedure according to a fourth embodiment.

The control to follow is the same for both the case of reading the image file data at the reader unit 200 and the case of transferring the image file data from the host computer 401, 402 via the network 400. This control will be described with reference to the flow chart of FIG. 13.

Prior to storing the acquired image in the memory card 275, the control device 110 displays a user confirmation screen on the operating unit 150 or host computer 401, 402 to make the user to select either making a digital signature of the image or not making it. (Step S1301).

Figure 15:
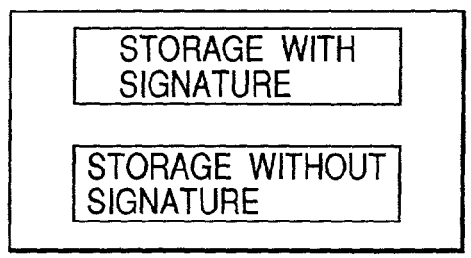
FIG. 15 is a diagram showing an example of a display screen of an operating unit of the image processing system of the first embodiment.

FIG. 15 shows an example of such a user confirmation screen. The invention is not limited only to this example. If a digital signature is not to be made, the image file data is stored in the memory card 275 (Step S1311) to thereafter terminate the control process.

If a digital signature is to be made, a user is instructed to judge whether a new secret key is to be generated (Step S1302). If the user judges that a new secret key is to be generated, the user enters a secret key password (Step S1302). Thereafter, the secret key is generated and stored (Step S1304). A public key is thereafter generated and stored (Step S1305).

If a new secret key is not formed, a secret key owned by the system is selected (Steps S1306) and then it is judged whether a public key exists (Step S1307). If it is judged that the public key does no exist, the flow advances to Step S1305 whereat a public key is generated and stored.

Next, a message digest value of the image file data to be signed is calculated (Step S1308) and encrypted by using the secret key (Step S1309), and the encrypted message digest value is stored as a signature in the memory card (Step S1310).

The secret key and its paired public key may be newly generated by a user when a digital signature is made or may use those already owned by the image processing system. If a secret key is generated by a user, the user enters an arbitrary password so that the control device automatically generates the secret and public keys.

The image file data to be signed is thereafter stored in the memory card (Step S1311).

Next, the control device 110 displays a user confirmation screen on the operating unit 150 or host computer 401, 402 to make the user to select either generating print job data or not generating it (Step S1312).

Figure 16:
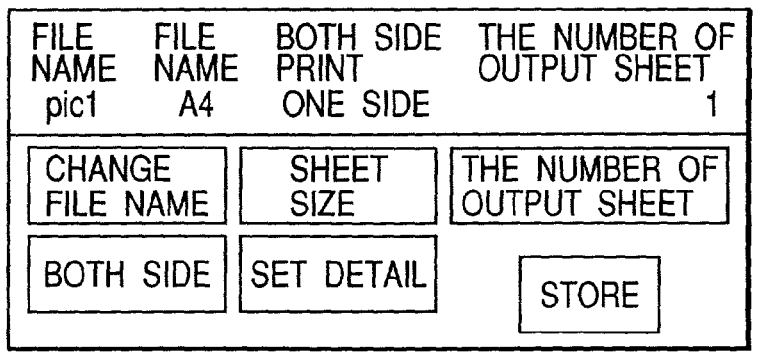
FIG. 16 is a diagram showing an example of a display screen of an operating unit of the image processing system of the second embodiment.

FIG. 16 shows an example of such a user confirmation screen. The invention is not limited only to this example.

If the user generates print job data, the user selects print job items such as an output sheet size, the number of output sheets and an option by using the operating unit, and the selected print job data is stored in the property file in the memory card (Step S1313).

Next, the control device 110 displays a user confirmation screen in order to make the user judge whether the secret key and its paired public key to be used when a signature is given to the image are to be stored in the memory card.

Figure 17:
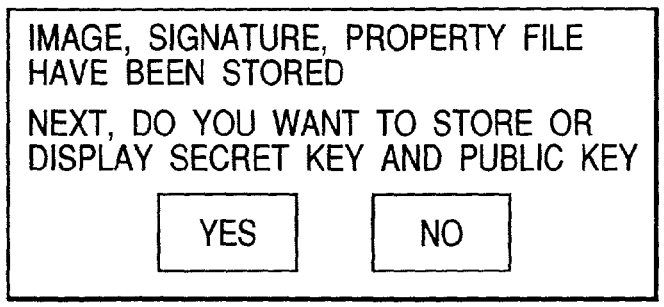
FIG. 17 is a diagram showing an example of a display screen of an operating unit of the image processing system of the third embodiment.

FIG. 17 shows an example of such a user confirmation screen. The invention is not limited only to this example.

Figure 14:
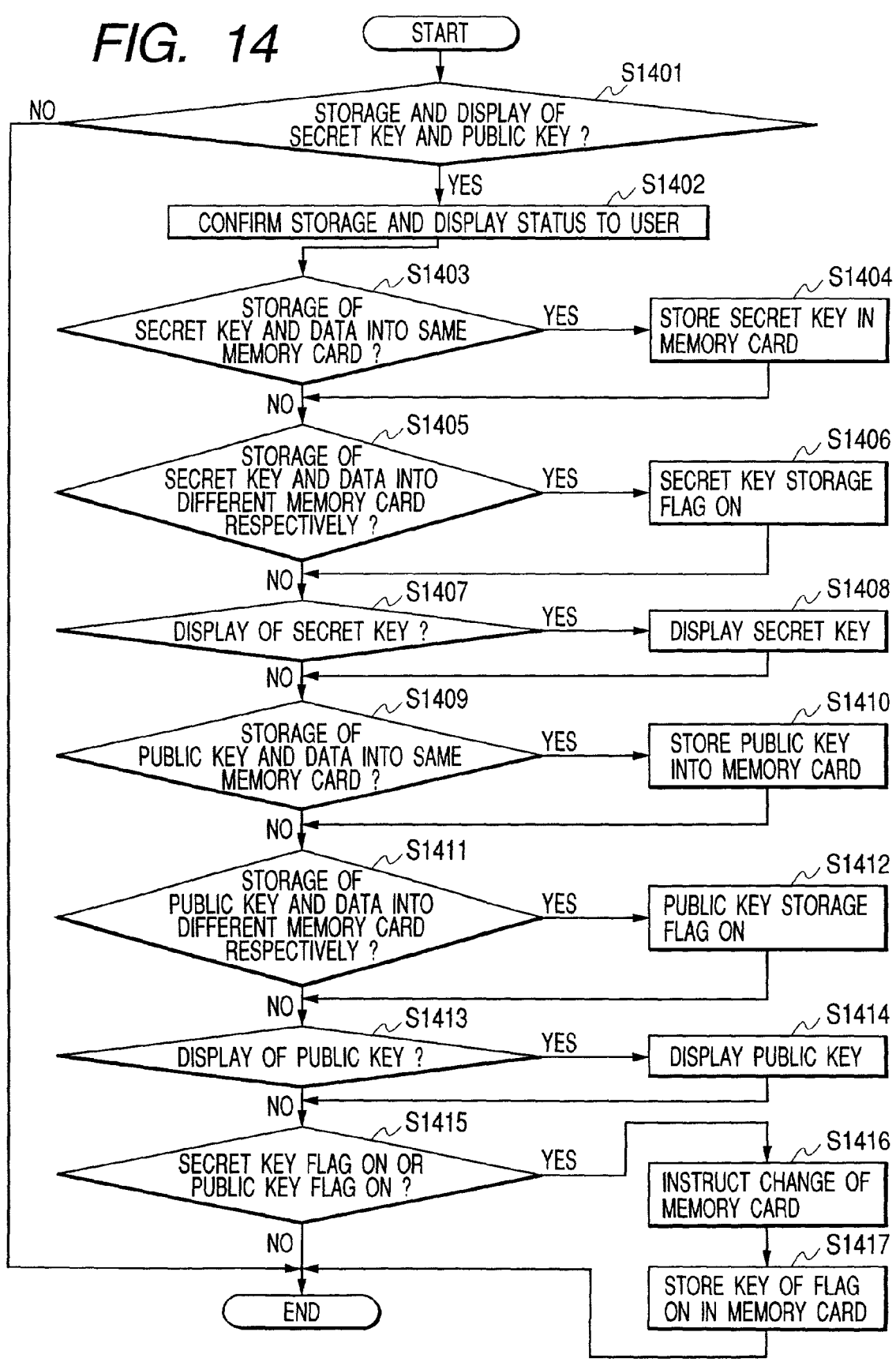
FIG. 14 is a flow chart illustrating a procedure of the fourth embodiment.

Next, a method of storing and displaying a secret key and a public key will be described with reference to the flow chart of FIG. 14.

First, a user is asked whether the secret and public keys are to be stored and displayed (Step S1400). If the secret and public keys are not stored and displayed, the process is terminated. If the process is to be continued, items for selecting methods of storing and displaying these keys are displayed on an output device (Step S1402).

Figure 18:
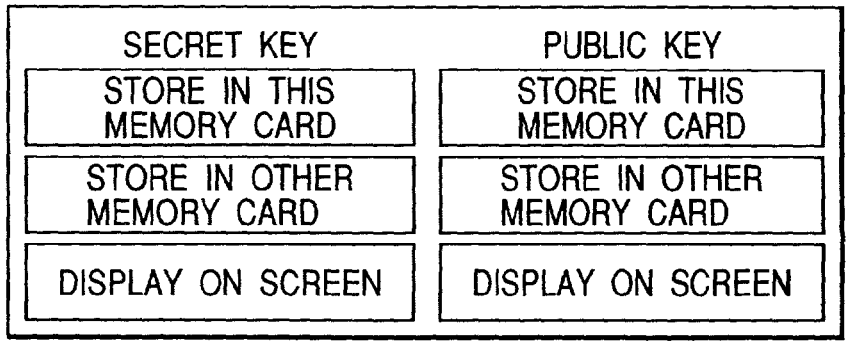
FIG. 18 is a diagram showing an example of a display screen of an operating unit of the image processing system of the fourth embodiment.

FIG. 18 shows an example of a user confirmation screen. The invention is not limited only to this example.

Such keys, particularly a public key, is used for examining the image file data and signature so that it is required to be stored by any method.

The following methods may be selectively used for storing and displaying the secret and public keys.

For the public key:

(1) the public key is stored in the same memory card as that storing the image file data and signature;

(2) the public key is stored in a memory card different from that storing the image file data and signature; or (3) the public key is displayed on the operating unit.

For the secret key:

(1) the secret key is stored in the same memory card as that storing the image file data and signature;

(2) the secret key is stored in a memory card different from that storing the image file data and signature; or (3) the secret key is displayed on the operating unit.

If the user instructs not to store and display the secret and public keys, the process is terminated.

If the user instructs to store and display the secret and public keys, the user is asked to confirm a storage and display status (Step S1402).

Next, the user is asked whether the secret key is to be stored in the same memory card as that storing the image file data with a signature (Step S1403). If the user instructs not to store the secret key in the same memory card, the flow advances to Step S1405, whereas if the user instructs to store the secret key in the same memory card, the secret key is stored in the same memory card as that storing the image file data (Step S1404) to thereafter advance to Step S1405.

Next, the user is asked at Step S1405 whether the secret key is to be stored in a memory card different from that storing the image file data with a signature. If the user instructs to store the secret key in the memory card different from that storing the image file data with a signature, the flow advances to Step S1406 whereat a secret key storage flag is turned on to thereafter advance to Step S1407.

At Step S1407 the user is asked whether the secret key is to be displayed. If the user instructs to display the secret key, the flow advances to Step S1408 whereat the secret key is displayed, whereas if the secret key is not to be displayed, the flow advances to Step S1409.

Next, the user is asked whether the public key is to be stored in the same memory card as that storing the image file data with a signature (Step S1409). If the user instructs not to store the public key in the same memory card, the flow advances to Step S1411, whereas if the user instructs to store the public key in the same memory card, the public key is stored in the same memory card as that storing the image file data (Step S1410) to thereafter advance to Step S1411.

Next, the user is asked at Step S1411 whether the public key is to be stored in a memory card different from that storing the image file data with a signature. If the user instructs to store the public key in the memory card different from that storing the image file data with a signature, the flow advances to Step S1412 whereat a public key storage flag is turned on to thereafter advance to Step S1413.

At Step S1413 the user is asked whether the public key is to be displayed. If the user instructs to display the public key, the flow advances to Step S1414 whereat the public key is displayed, whereas if the public key is not to be displayed, the flow advances to Step S1415.

It is checked at Step S1415 whether the secret key storage flag or public key storage flag was turned on.

If the flag was turned on, the flow advances to Step S1416 whereat the user is instructed to change a memory card. After the changed card is recognized, the key with the turned-on flag is stored in this memory card (Step S1417).

The secret and public keys, signature and image file data may be stored in the memory card 275 in an area write-disabled for systems other than the subject system.

Other Embodiments

The invention is also applicable to a system having a plurality of apparatuses (e.g., a host computer, an interface apparatus, a reader, a printer and the like) or to a single apparatus.

The scope of the invention contains also the case wherein software program codes realizing the function of each embodiment described above are supplied to a computer (CPU or MPU) of the apparatus or system connected to various devices realizing the embodiment function, and the computer operates the devices in accordance with the stored programs.

In this case, the software program codes themselves realize the embodiment function. Therefore, the program codes themselves and means for supplying the program codes, e.g., a storage medium storing the program codes, constitute the present invention.

The storage medium for storing such program codes may be a floppy disk, a hard disk, an optical disk, a magnetooptical disk, a CD-ROM, a magnetic tape, a nonvolatile memory card, a ROM or the like.

It is obvious that the program codes are included in the embodiment of the invention, wherein not only the computer executes the supplied program codes to realize the embodiment function but also the program codes in cooperation with an OS (operating system) running on the computer or with another application or the like realize the embodiment function.

It is obvious that the scope of the invention also contains the case wherein the functions of each embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

In the above embodiments, although a memory card is used as a storage medium, the storage medium is not limited only to a memory card but other storage media may also be used, such as a stick-type memory medium.

In the above embodiments, both or one of the secret and public keys may be stored together with the digital signature data.

Although the property information for designating an image processing method is used for a printer, it may be used for a display device to designate its image displaying method. For example, the property information for designating the image displaying method may obviously be applied to: designating a display state of a designated image; displaying a plurality of images through a slide show; designating a method of changing a display to the next image; and designating a display color and a display size.

It is obvious that data communication may be applied to: designating an image to be transferred; designating a communication partner; and designating a communication method.

As described above, by storing the property information for designating an image output format in a memory card, an image in a format intended by a distributor (writer) can be supplied. Such format includes, for example, to record which image or images are recorded on a single sheet, to designate a resolution of each image, to combine an additional image representative of an image proprietor, and the like.

It is possible to prevent a distributed image from being changed from the designated image output format intended by the distributor to another image output format to be caused by data alteration.

When a copyrighted image is distributed, the image data can be supplied together with the information identifying the copyright holder.

By inhibiting an output process when it is recognized that the data was altered, it becomes possible to prevent illegally output of the altered data.

The image supply side can output an image guaranteed as genuine.

A new style of image distribution can be provided by storing image data and the property information designating an image output format in a detachable memory such as a memory card and by inhibiting an output of an altered image or by outputting data indicating a presence of alteration. It is therefore possible to prevent illegal output of a copyrighted image. The image output format intended by a distributor can be guaranteed.

As described so far, according to the present invention, when image file data with a signature stored in a storage medium and transferred to an image processing system is output, a message digest value of the image file data calculated in the image processing system by using a one-way function is compared with a value obtained by decrypting the signature by using the public key. It is therefore possible to reliably check whether the image file data was altered or not and to considerably improve the reliability of an image stored in the storage medium.

According to another feature of the invention, selections by a user are written in a property file so that the user can easily examine and output image file data.

According to another feature of the invention, since the image processing system is connected to a host computer via a network, image file data can be read from a storage medium connected to a memory card I/F unit different from that of the image processing system and can be transferred to the image processing system. A user can easily examine and output image file data.

According to another feature of the invention, when image file data acquired by the reader unit or generated by a host computer is stored in a storage medium, a message digest value of the image file data is calculated by using a one-way function, the message digest value is given a signature by using a secret key, and the signature together with the image file data is stored in the storage medium. It is possible to reliably prevent alteration of the image file data and to improve the reliability of the image file data.

The invention is not limited only to the above-described embodiments, but various modifications are possible within the scope of the appended claims.

What is claimed is:

1. An image processing apparatus for processing an image in accordance with property information for defining an image processing method for processing image data of the image and for specifying an image output format of the image data, comprising:
inputting means for inputting the image data, key information used for recognizing alteration of the image data, and the property information;
judging means for judging from the image data and the key information input by said inputting means whether the image data was altered; and
controlling means for controlling an execution of the image processing method in accordance with a judgement by said judging means and the property information.

2. An image processing apparatus according to claim 1, further comprising an interface for accessing a detachable memory wherein the image data, the key information and the property information are stored in the detachable memory.

3. An image processing apparatus according to claim 1, wherein the property information defines the image processing method used for executing printing output.

4. An image processing apparatus according to claim 1, wherein the property information defines contents of the control to be executed by said controlling means in accordance with the judgement by said judging means.

5. An image processing apparatus according to claim 1, wherein the image data input by said inputting means includes a digital signature, the key information is key information used for the digital signature, and said image processing apparatus further comprises digital signature decrypting means for decrypting the digital signature by using the key information.

6. An image processing apparatus according to claim 5, wherein said judging means executes a judgement process by comparing information obtained by calculating the image data in a predetermined manner with information obtained by said digital signature decrypting means.

7. An image processing method for processing an image in accordance with property information for defining an image data processing method image and for specifying an image output format of the image data, comprising the steps of:
inputting image data, key information used for recognizing alteration of the image data, and the property information;
judging from the image data and the key information input at said inputting step whether the image data was altered; and
controlling an execution of the image processing method in accordance with a judgement at said judging step and the property information.

8. A computer-readable memory storing a data processing program for controlling a processor to carry out the method on claim 7.

9. An image processing system with an interface capable of accessing a memory medium, comprising:
information reading means for reading a digital signature of image file data stored in the memory medium, a secret key used for the digital signature, or a public key paired to the secret key, together with the image file data and property information for defining an image processing method for processing image data image and for specifying an image output format of the image data; and
image output controlling means for outputting an image in accordance with information read by said information reading means.

10. An image processing system according to claim 9, further comprising digital signature decrypting means for decrypting the digital signature of the image file data read by said information reading means by using the public key.

11. An image processing system according to claim 9, further comprising calculating means for calculating an image file specific value obtained from the image file data by using one-way function.

12. An image processing system according to claim 9, further comprising image file data examining means for examining the image file data in accordance with a data value obtained by said digital signature decrypting means and the value obtained by the calculating means.

13. An image processing system with an interface capable of accessing a memory medium, comprising:
    memory medium detecting means for detecting a connection of the memory medium to the interface;
    information reading means, responsive to a detection of the connection of the memory medium by said memory medium detecting means, for reading a digital signature of image file data stored in the memory medium, a secret key used for the digital signature, or a public key paired to the secret key, together with the image file data and property information for defining an image processing method for processing image data image and for specifying an image output format of the image data; and
    image output controlling means for outputting an image in accordance with information read by said information reading means.

14. An image processing system with an interface capable of accessing a memory medium, comprising:
    image file data generating means for generating image file data to be stored in the memory medium;
    property information generation means for generating property information for defining an image processing method for processing the image file data and for specifying an image output format of the image file data;
    image file data storing means for storing the image file data generated by said image file data generating means and the property information generated by said property information generation means in the memory medium;
    calculating means for calculating an image file specific value obtained from the image file data by using a one-way function; and
    digital signature generating means for generating a digital signature by decrypting the value calculated by said calculating means by using a secret key stored in the memory medium.

15. An image processing system according to claim 14, further comprising:
    first storing means for storing the digital signature generated by said digital signature generating means together with property information for defining an image data processing method for processing image data in a property area of the memory medium; and
    second storing means for storing the image file data to be signed in the memory medium.

16. An image processing system according to claim 14, wherein the secret key for decrypting the value calculated by said calculating means is an apparatus specific secret key.

17. An image processing system according to claim 14, further comprising secret key generating means for newly generating a secret key for decrypting the value calculated by said calculating means, in accordance with a user definition.

18. An image processing method for an image processing system with an interface capable of accessing a memory medium, the method comprising the steps of:
    reading a digital signature of image file data stored in the memory medium, a secret key used for the digital signature, or a public key paired to the secret key, together with the image file data and property information for defining an image processing method for processing image data and for specifying an image output format of the image data; and
    outputting an image in accordance with information read at said information reading step.

19. An image processing method according to claim 18, further comprising a step of decrypting the digital signature of the image file data read at said information reading step by using the public key stored in the memory medium.

20. An image processing method according to claim 18, further comprising a step of calculating an image file specific value obtained from the image file data by using one-way function.

21. An image processing method according to claim 20, further comprising the steps of:
    decrypting the digital signature of the image file data;
    comparing a value obtained at said digital signature decrypting step with the value obtained at the calculating step; and
    examining the image file data in accordance with a comparison result at said comparing step.

22. An image processing method for an image processing system with an interface capable of accessing a memory medium, comprising:
    a memory medium detecting step of detecting a connection of the memory medium to the interface; a reading step, responsive to a detection of the connection of the memory medium at said memory medium detecting step, of reading a digital signature of image file data stored in the memory medium, a secret key used for the digital signature, or a public key paired to the secret key, together with the image file data and property information for defining an image processing method for processing image data and for specifying an image output format of the image data; and
    outputting an image in accordance with information read at said reading step.

23. An image processing method for an image processing system with an interface capable of accessing a memory medium, comprising the steps of:
    generating image file data to be stored in the memory medium;
    generating property information for defining an image processing method for processing the image file data and for specifying an image output format of the image file data;
    storing the image file data generated at said image file data generating step and the property information generated at said property information generation step in the memory medium;
    calculating an image file specific value obtained from the image file data by using a one-way function; and
    generating a digital signature by decrypting the value calculated at said calculating step by using a secret key stored in the memory medium.

24. An image processing method for an image processing system according to claim 23, further comprising the steps of:
    storing the digital signature generated at said digital signature generating step together with a property file in a property area of the memory medium; and storing the image file data to be signed in an image file area of the memory medium.

25. An image processing method according to claim 20, wherein the secret key for decrypting the value calculated at said calculating step is an apparatus specific secret key.

26. An image processing method according to claim 20, further comprising a step of newly generating a secret key for decrypting the value calculated at said calculating step, in accordance with a user definition.

27. A computer-readable memory medium having-computer-readable program code means encoded thereon and executed by a computer, said code means comprising:
   first code means for reading a digital signature of image file data stored in the memory medium, a secret key used for the digital signature, or a public key paired to the secret key, together with the image file data and property information for defining an image processing method for processing image data and for specifying an image output format of the image data; and
   second code means for outputting an image in accordance with information read at said information reading.

28. A computer-readable memory medium having computer-readable program code means encoded thereon and executed by a computer, said code means comprising:
   first code means for detecting a connection of the memory medium to the interface and for reading, responsive to a detection of the connection of the memory medium at said memory medium detecting, a digital signature of image file data stored in the memory medium, a secret key used for the digital signature, or a public key paired to the secret key, together with the image file data and property information for defining an image processing method for processing image data and for specifying an image output format of the image data; and
   second code means for outputting an image in accordance with information read at said reading.

29. A computer-readable memory medium having computer readable program code means encoded thereon and executed by a computer, said code means comprising:
   first code means for generating image file data to be stored in the memory medium;
   second code means for generating property information for defining an image processing method for processing the image file data and for specifying an image output format of the image file data;
   third code means for storing the image file data generated at said image file data generating step and the property information generated at said property information generation in the memory medium;
   fourth code means for calculating an image file specific value obtained from the image file data by using a one-way function; and
   fifth code means for generating a digital signature by decrypting the value calculated at said value calculating by using a secret key stored in the memory medium.

* * * * *